United States Patent [19]

Kuo

[11] Patent Number: 5,576,897
[45] Date of Patent: Nov. 19, 1996

[54] MULTI-LENS OPTICAL DEVICE FOR USE IN AN OPTICAL SCANNER

[75] Inventor: Shih-Hung Kuo, Hsin Chu, Taiwan

[73] Assignee: Tamarack Telecom, Inc., Taipei, Taiwan

[21] Appl. No.: 379,200

[22] Filed: Jan. 24, 1995

[51] Int. Cl.⁶ ........................................... G02B 7/02
[52] U.S. Cl. ........................... 359/822; 359/821; 359/441; 359/889
[58] Field of Search ..................... 359/811, 813, 359/821, 822, 210, 894, 889, 441, 442; 355/45, 55

[56] References Cited

U.S. PATENT DOCUMENTS

| | | | |
|---|---|---|---|
| 2,871,776 | 2/1959 | Calamai | 359/821 |
| 3,355,810 | 12/1967 | Franklin | 359/442 |
| 3,631,775 | 1/1972 | Tidd | 359/821 |
| 4,324,050 | 4/1982 | Weir | 359/442 |
| 4,544,236 | 10/1985 | Endo | 359/821 |
| 4,942,425 | 7/1990 | Kamimura et al. | 355/45 |
| 5,122,911 | 6/1992 | Kuo | 359/889 |
| 5,128,808 | 7/1992 | Dosaka | 359/821 |
| 5,285,224 | 2/1994 | Sims | 359/441 |

*Primary Examiner*—Loha Ben

[57] ABSTRACT

A multi-lens optical device for use in an optical scanner including a lens holder having a viewing aperture, and a lens unit disposed in front of the viewing aperture, wherein the lens unit includes a lens holder, a plurality of lenses of different magnifying power respectively mounted on the lens holder, a reversible motor, and a reduction gearing driven by the reversible motor to move the lens holder, permitting one lens to be aligned with the viewing aperture for scanning.

1 Claim, 3 Drawing Sheets

MULTI-LENS OPTICAL DEVICE FOR USE IN AN OPTICAL SCANNER

BACKGROUND OF THE INVENTION

The present invention relates to optical devices, and relates more particularly to a multi-lens optical device for use in an optical scanner which provides different scan area and achieves high resolution.

Optical scanner suppliers commonly provide their scanners with a scanner driving program and an application software program. The scanner driving program of an optical scanner provides default settings on resolution, brightness, contrast, color, gray scale, half tone scale, and preview scan area. Regular optical scanners set the final scan area subject to the preview image in the preview scan area. Because conventional optical scanners commonly have only one single lens, they can only select the maximum optical resolution within the scan area for proceeding the scanning operation. For example, if the charge coupled device (image sensor) has 5340 cells and the scan area is 8.5" (A4), the maximum optical resolution of the image is 600 dpi (dot/inch) or 5100 dot cells when only one single lens is used. If a multi-lens optical device is used, different resolutions can be selected with different lenses, and the scan area will be relatively changed. Through the scanner driving program, the scanner user can control the operation of the lenses of the multi-lens optical device. Because conventional optical scanners use only one single lens for scanning, different optical scanners should be used for different scanning operations. Therefore, when to scan the scan area of a different resolution, an additional optical scanner must be installed.

SUMMARY OF THE INVENTION

The present invention has been accomplished under the circumstances. It is the primary object of the present invention to provide a multi-lens optical device which uses a multi-lens lens unit so as to improve the optical resolution of the scanner. It is another object of the present invention to provide a multi-lens optical device for use in an optical scanner which is simple in structure. It is another object of the present invention to provide a multi-lens optical device for use in an optical scanner which is easy and inexpensive to manufacture.

BRIEF DESCRIPTION OF THE DRAWINGS

The present invention will now be described by way of example with reference to the annexed drawings, in which.

DETAILED DESCRIPTION OF THE PREFERRED EMBODIMENT

Figure 1:
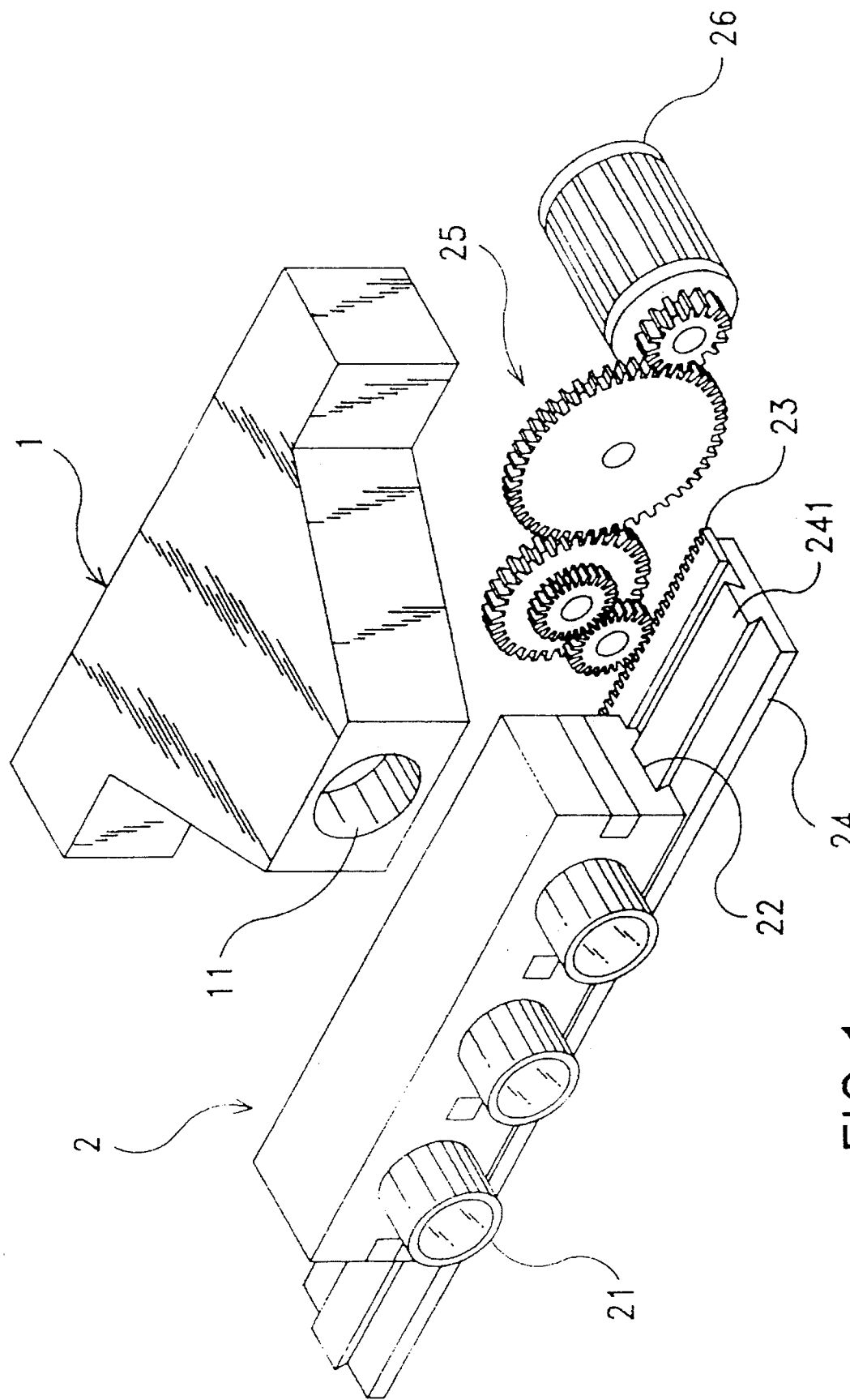
FIG. 1 is an elevational view of a multi-lens optical device for use in an optical scanner according a first embodiment of the present invention.
Figure 2:
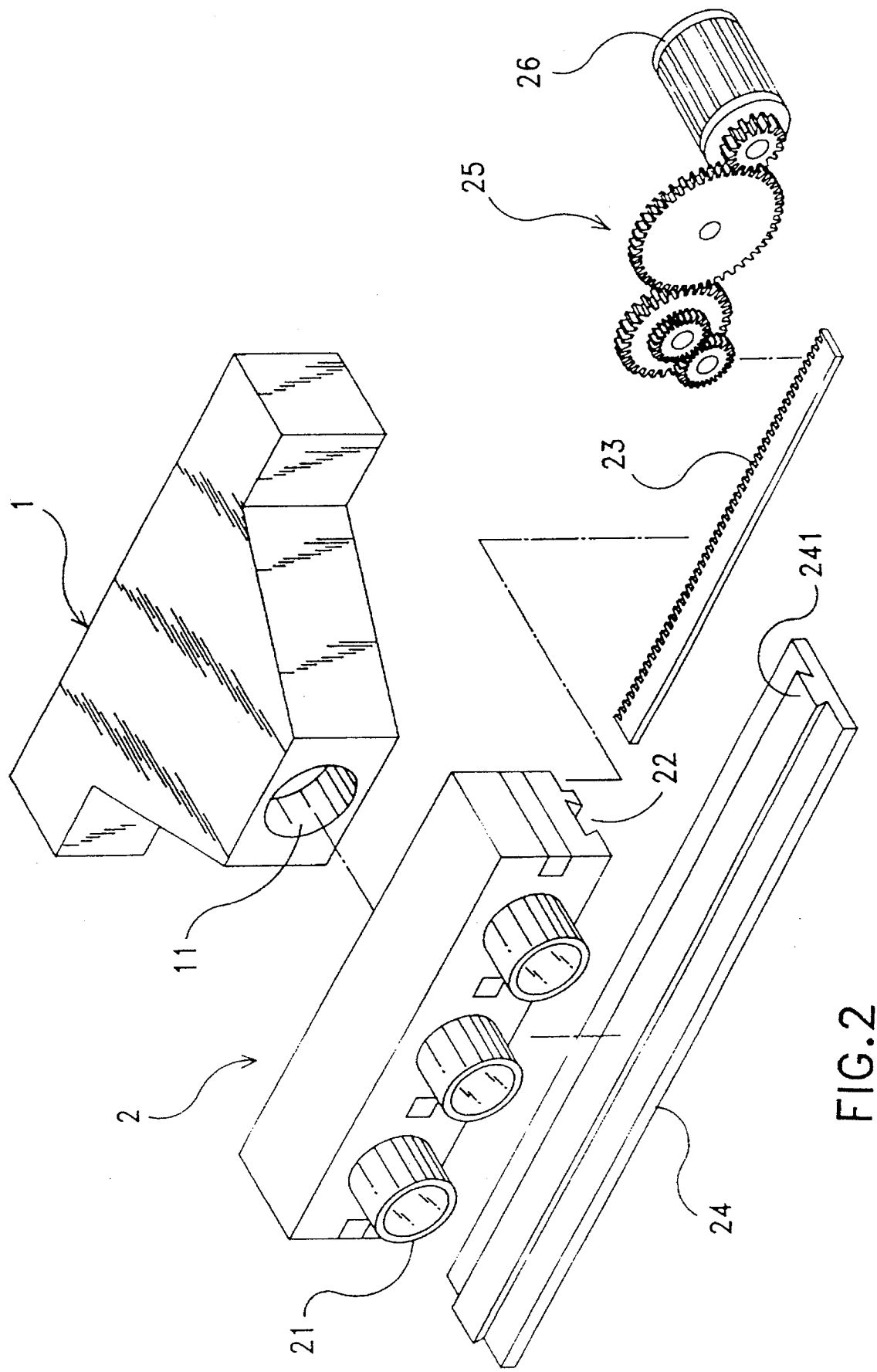
FIG. 2 is an exploded view of FIG. 1.

Referring to FIGS. 1 and 2, a multi-lens optical device for use in an optical scanner in accordance with one embodiment of the present invention is generally comprised of an image sensor holder 1, and a lens holder 2. The image sensor holder 1 has a viewing aperture 11. The lens holder 2 is made of elongated shape and disposed in front of the viewing aperture 11 of the image sensor holder 1 to hold a series of lenses 21 of different magnifying power, having a dovetail groove 22 longitudinally disposed at the bottom side thereof and matched with the longitudinal dovetail tongue 241 of a base frame 24. A rack 23 is fixedly fastened to the lens holder 2 at one side along the length of the lens holder 2 and meshed with a reduction gearing 25, which is turned by a reversible motor 26. When the reversible motor 26 is turned in one direction, the lens holder 2 is moved forward along the dovetail tongue 241 of the base frame 24. When the reversible motor 26 is turned in the reversed direction, the lens holder 2 is moved backward along the dovetail tongue 241 of the base frame 24. Therefore, by means of controlling the operation of the reversible motor 26, the lens holder 2 can be moved along the dovetail tongue 241 of the base frame 24 to align one lens 21 with the viewing aperture.

Figure 3:
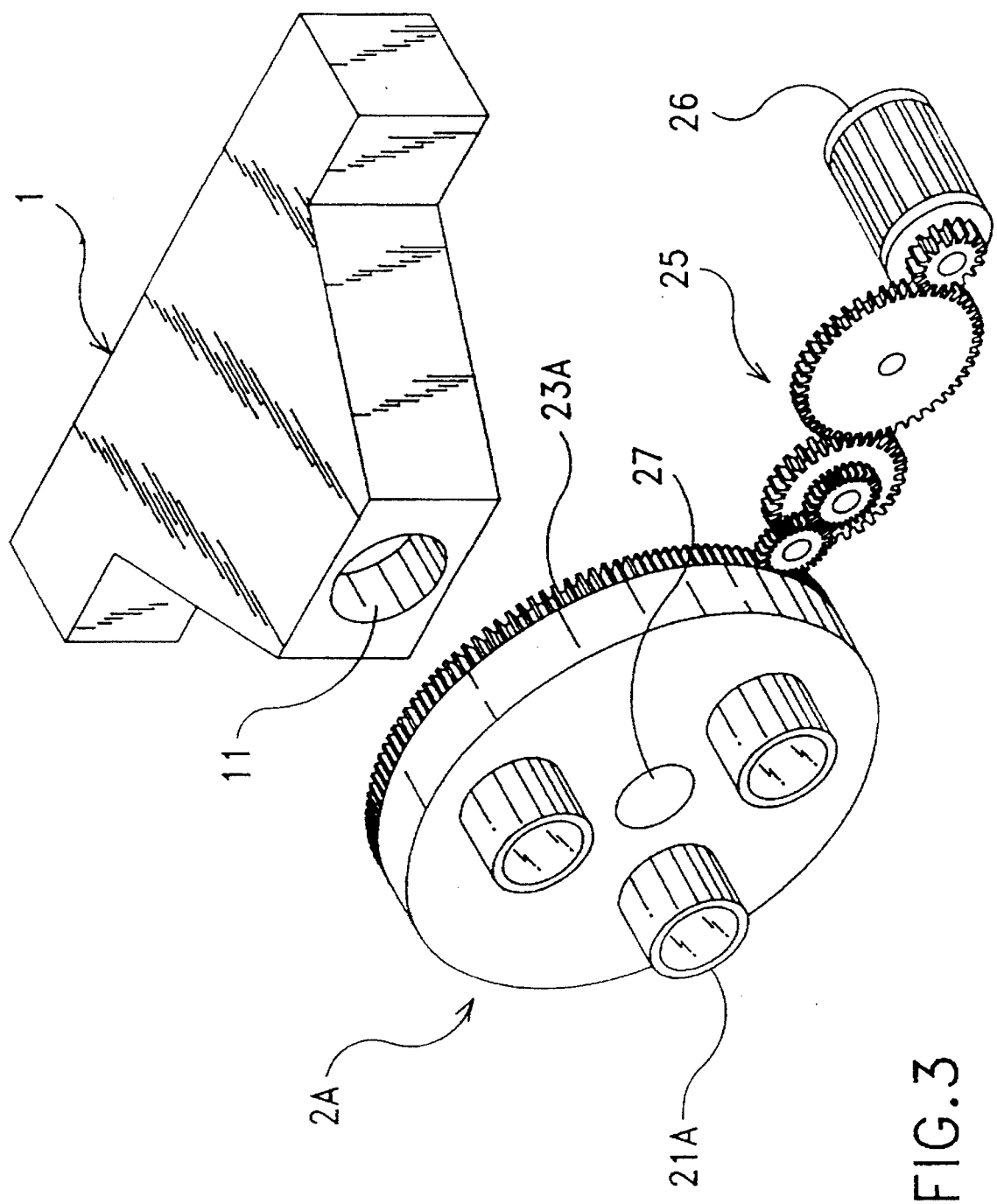
FIG. 3 is an elevational view of a multi-lens optical device for use in an optical scanner according to a second embodiment of the present invention.

FIG. 3 shows an alternate form of the present invention. According to this alternate form, the lens holder 2A is made of circular shape and turned about a shaft 27, having an external gear 23A meshed with the reduction gearing 25 and a plurality of lenses 21A of different magnifying power disposed around the shaft 27. When the reversible motor 26 is started, the external gear 23A is turned by the reduction gearing 25, causing the lens holder 2A turned about the shaft 27. Therefore, the lens holder 2A can be turned to align one lens 21A with the viewing aperture 11.

While only two embodiments of the present invention have been shown and described, it will be understood that various modifications and changes could be made without departing from the spirit and scope of the invention.

I claim:

1. A multi-lens optical device for use in an optical scanner comprising:

an image sensor holder having a viewing aperture;

a lens unit disposed in front of said viewing aperture, wherein said lens unit comprises a lens holder and a plurality of lenses of different magnifying powers respectively mounted on said lens holder;

a reversible motor; and a reduction gearing driven by said reversible motor;

said lens holder being made of elongated shape having a dovetail groove matched with a dovetail tongue on a base frame, and a long side, fixedly mounted to the lens holder, having a rack meshed with said reduction gearing, whereby said lens holder is moved along said dovetail tongue by said reversible motor through said reduction gearing via said rack to let one lens at a time be aligned with said viewing aperture for scanning.

* * * * *